June 3, 1958  R. C. WILLIAMS ET AL  2,837,378
HYDRAULIC RECOIL MECHANISM
Filed Sept. 14, 1954  2 Sheets-Sheet 1
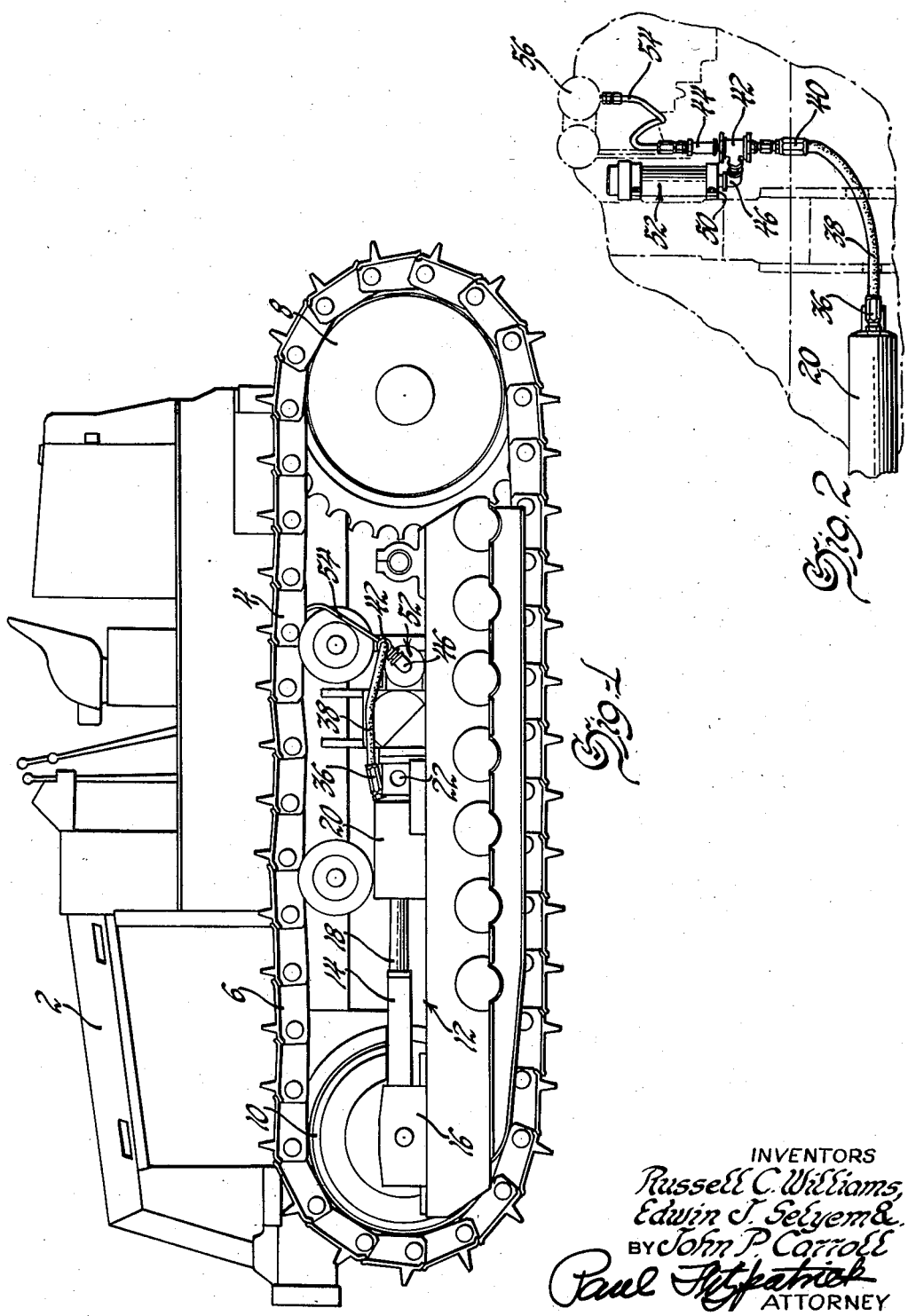
INVENTORS
Russell C. Williams,
Edwin J. Selyem &
BY John P. Carroll
Paul Fitzpatrick
ATTORNEY June 3, 1958    R. C. WILLIAMS ET AL    2,837,378
HYDRAULIC RECOIL MECHANISM Filed Sept. 14, 1954    2 Sheets-Sheet 2

INVENTORS
Russell C. Williams,
Edwin J. Selyem &
BY John P. Carroll
Paul Fitzpatrick
ATTORNEY United States Patent Office 2,837,378
Patented June 3, 1958

2,837,378

HYDRAULIC RECOIL MECHANISM

Russell C. Williams, Rocky River, Edwin J. Selyem, North Royalton, and John P. Carroll, Fairview Park, Ohio, assignors to General Motors Corporation, Detroit, Mich., a corporation of Delaware Application September 14, 1954, Serial No. 455,999

10 Claims. (Cl. 305—9)

This invention relates to track adjusting mechanisms for track laying vehicles. In prior art it has been customary to provide for track tension and absorption of shock on the track links by means of a yieldably movable track idler wheel having resilient means associated therewith for urging the idler wheel forwardly to normally take up the slack in track linkage. In most instances in the past, relatively heavy coil spring mechanisms have been utilized to yieldably urge the idler wheel forwardly against a predetermined fixed stop which is adjusted to provide suitable track tensioning under normal conditions. In the event that rocks or other obstructions become lodged between the tracks and idler wheel or drive sprocket, the idler wheel must recede against the pressure of the coil spring until the obstruction becomes dislodged, and thereafter returns to the forward predetermined position in response to pressure of the spring. While this construction has been reasonably efficient, numerous disadvantages arise with respect to initial assembly, as well as replacement in the event of field breakage. In addition, wear resulting from operation of the vehicle requires frequent manual readjustment of the fixed stops to maintain desired normal track tension.

An object of the present invention is to provide a hydraulic idler wheel positioning mechanism.

Another object is to provide a dual pressure hydraulic recoil mechanism for normally maintaining suitable track tension and which is capable of providing relatively high resistance to recoil of the idler wheel from the normal position.

A further object is to provide a hydraulic idler wheel positioning mechanism adapted to automatically compensate for increases in length of the endless track resulting from wear.

Yet a further object is to provide a device of the type described wherein light forward hydraulic pressure is constantly maintained against the idler wheel while greatly increaser pressure is exerted when the latter recoils as a result of obstructions passing between the tracks.

Still a further object is to provide a device of the stated character having a fluid pressure generating means for maintaining a relatively moderate forward pressure, a pre-charged high-pressure accumulator mechanism associated therewith which is instantaneously response to reverse operation of the mechanism to resist recoil of the idler wheel.

These and other objects and advantages of the invention will become more fully apparent as reference is had to the accompanying specification and drawing wherein:

Fig. 1 is a side elevational view of a crawler tractor illustrating the form and arrangement of the invention and its relation to the track idler wheel structure.

Fig. 2 is a fragmentary plan view of a portion of the tractor shown in Fig. 1, illustrating the structure and relative ararngement of the invention.

Figure 3:
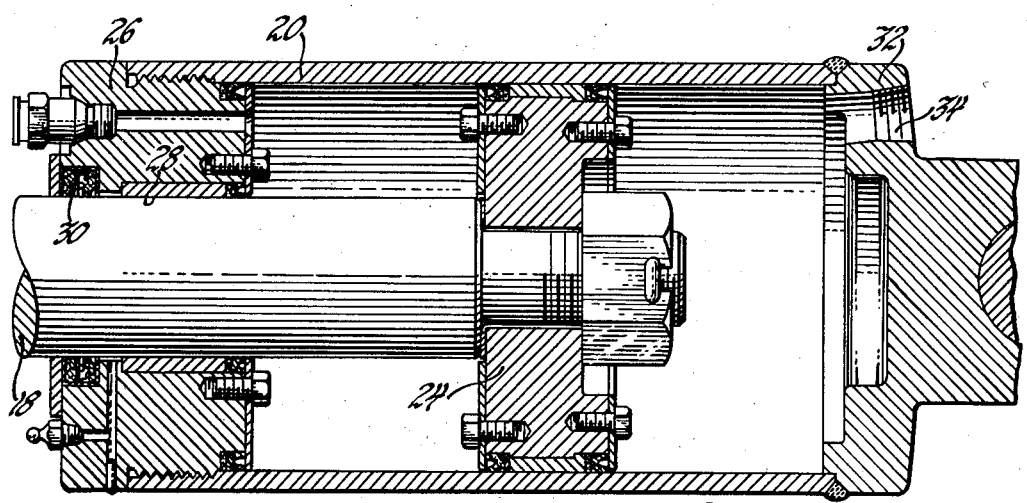
Fig. 3 is a sectional elevational view of the recoil cylinder assembly.

Referring now to the drawing and particularly Fig. 1 is illustrated a crawler tractor 2 having two self-laying track units 4 at opposite sides thereof. While but one side of the vehicle is illustrated it will be understood that the opposite side is identical in structure and configuration and the description given with reference to the left side applies equally to the right side. Self-laying track units 4 comprise an endless track belt 6 which extends around and engage a sprocket drive wheel 8 at the rear of the vehicle and a circular idler wheel 10 at the front of the vehicle. Drive wheel 8 is operatively connected to the vehicle power plant, not shown, and is adapted to propel the track 6 in a conventional manner. Idler wheel 10 is rotatably mounted at the forward end of track rails 12 and is attached for fore and aft sliding movements thereon to provide tensioning of the endless track 6 during operation of the vehicle.

Figure 4:
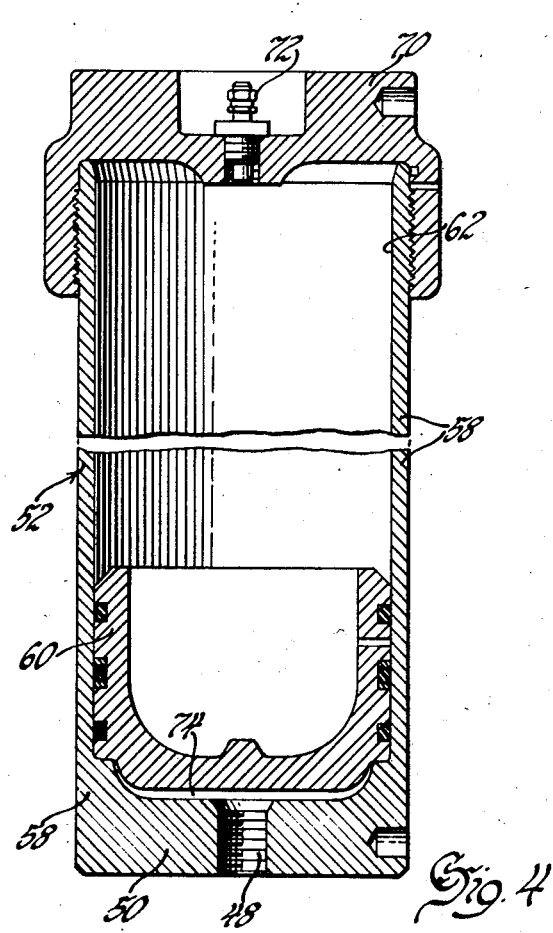
Fig. 4 is a fragmentary sectional plan view of the high-pressure accumulator structure.

In order to accomplish the tensioning of the track 6 and to provide suitable resistance to recoil thereof in accordance with the present invention, there is provided a forked yoke 14, the forward end of which engages idler wheel mounting structure 16. At its rear end, yoke 14 is formed with a shaft 18 which extends rearwardly into a closed hydraulic cylinder 20. Cylinder 20 is pivotally mounted at its rear end by a pin and clevis structure 22. Disposed interiorly of cylinder 20 and rigidly connected at the rear end of shaft 18 is a piston 24. Piston 24 is adapted for reciprocating movement longitudinally in cylinder 20 responsive to fore and aft movement of idler wheel 10. As seen best in Fig. 3, the forward end of cylinder 20 is provided with a threaded cap structure 26 having a bore 28 formed concentrically therein which closely surrounds shaft 18 and is provided with a packing ring 30 to accomplish a fluid type seal between bore 28 and shaft 18. At its rear closed end 32, cylinder 20 is provided with a communicating aperture 34 to which is connected a hydraulic fluid line connector 36 formed at one end of hydraulic line 38. At its opposite end hydraulic line 38 is formed with a second connector 40 which threadably engages a pipe-T 42, which, in turn, communicates with one end of a check valve assembly 44 and pipe elbow 46. Elbow 44 is threadably connected with threaded aperture 48 formed in the base 50 of a piston type accumulator which will be described further herein. At its opposite end, check valve 44 is connected in communicating relation with one end of a second hydraulic fluid line 54, the opposite end of which communicates with the pressure delivery side of a suitable hydraulic pressure generating pump 56. Pump 56 may be of any suitable type and is adapted to provide constant line pressure of approximately 100 p. s. i. during operation of the vehicle. As seen best in Fig. 4 accumulator 52, previously referred to, comprises a closed bottom cylindrical container 58 in which is disposed a free piston 60. At its open end 62, cylinder 58 threadably engages a cap structure 70. Formed concentrically in cap structure 70 is a valve assembly 72 through which inert gas, such as nitrogen, is introduced into cylinder 58 to provide a static pressure of approximately 1,000 p. s. i. It will be apparent that piston 60 is normally maintained against the base 50 of cylinder 58 by the pressure of the nitrogen gas. Consequently, hydraulic pressure in fluid line 38 and recoil cylinder 20 is normally unaffected by the pressure in accumulator 52. Hence, the maximum normal pressure in the hydraulic system is maintained constantly at 100 p. s. i. by the pressure of hydraulic pump 56. Therefore, in normal operation, piston 24 and yoke 14 are yieldably urged forwardly by the pressure exerted by pump 56 and resiliently urge idler wheel 10 forwardly to provide suitable track tension. It is particularly important to note that in the present construction original assembly and installation of the recoil mechanisms is extremely simple since the track links may be assembled over the drive sprocket and idler wheel before charging the recoil mechanism. Thereafter, the track is drawn up to the desired tension by operation of pump 56 until hydraulic lines 54, 40 and the interior of cylinder 20 are filled with hydraulic fluid. By way of comparison previous types of recoil mechanisms wherein heavy coil springs are employed are extremely difficult to assemble originally and present considerable danger in the event that disassembly in the field is required.

As previously pointed out, the normal 100 p. s. i. pressure on piston 24 is normally unaffected by the high pressure of accumulator 52. However, when stones or other obstructions become lodged between the tracks and drive sprocket or idler wheel, the latter must necessarily recoil to permit the obstructions to pass between the members. While it is necessary that the idler wheel recoil in this manner, it has been found that relatively light resistance to recoil of the idler wheel may permit temporary undue slackness in the endless track and cause damage to the drive sprocket. Accordingly it is necessary that the resistance to recoil be much greater than the relatively low tensioning pressure exerted by pump 56. In the present invention this is accomplished by utilizing the relatively high static pressure in accumulator 52. In operation, when the idler wheel is forced to recoil to permit clearance of passing obstacles, piston 24 retracts in cylinder 20 and reverses the direction of flow hydraulic fluid through line 38, causing check valve 44 to close. As soon as check valve 44 closes further rearward movement of piston 24 causes oil to pass from T 46 into the cavity 74 between the base 50 of accumulator cylinder 58 and bottom wall of free piston 60. Since movement of piston 60 in cylinder 58 is resisted by 1,000 p. s. i. nitrogen pressure, further rearward movement of idler wheel 10 is yieldably resisted by accumulator pressure. Upon passage of the obstruction idler wheel 10 and piston 24 return forwardly to the normal position, permitting the hydraulic fluid temporarily displaced in cavity 74 to re-enter cylinder 20. Simultaneously, check valve 44 re-opens and allows pump 56 to again exert 100 p. s. i. line pressure to maintain the idler wheel in the desired track tensioning position.

From the foregoing it will be seen that a novel and highly efficient track adjusting and recoil mechanism has been provided. The device is not only simple in construction and efficient in operation, but is exceptionally easy to assemble, disassemble and service. In addition, compensation for changes in track length incident to normal wear is automatic whereas in the prior art structures periodic re-adjustment has been required. In this connection it should be pointed out that tests have shown that a considerably more uniform wear pattern is attained when the idler wheel is maintained against the track by constant moderate pressure.

While but one embodiment of the invention has been shown and described it should be apparent that other changes and modifications may be made therein. It is therefore to be understood that it is not intended to limit the invention to the embodiments shown not only by the scope of the claims as follows:

We claim:

1. A hydraulic recoil mechanism comprising a cylinder, a piston movable in said cylinder, a source of low-fluid pressure, conduit means connecting said cylinder with said source of low-fluid pressure to maintain yieldable forward pressure on said piston, a source of high-fluid pressure, means connecting said source of high-fluid pressure in communicating relation with said conduit, means movable to a fixed position to resist said high pressure, a check valve in said conduit, said valve being movable to closed position upon movement of said piston against said low-fluid pressure, whereby passage of fluid out of said cylinder yieldably displaces said movable means against said high-pressure source.

2. A hydraulic recoil mechanism comprising a cylinder, a piston movable in said cylinder, a source of low fluid pressure, conduit means connecting said cylinder with said source of low-fluid pressure to maintain yieldable forward pressure on said piston, a source of high-fluid pressure, means connecting said source of high-fluid pressure in communicating relation with said conduit, means disposed between said source of high-fluid pressure and said last-mentioned means and movable to a fixed position to resist said high pressure, a check valve in said conduit, said valve being movable to closed position upon movement of said piston against said low-fluid pressure, whereby passage of fluid out of said cylinder yieldably displaces said movable means against said high-pressure source.

3. A hydraulic recoil mechanism comprising a cylinder, a piston movable in said cylinder, a source of low-fluid pressure, conduit means connecting said cylinder with said source of low-fluid pressure to maintain yieldable forward pressure on said piston, a source of high-fluid pressure, means connecting said source of high-fluid pressure in communicating relation with said conduit, mean disposed between said source of high-fluid pressure and said last-mentioned means and movable to a fixed position to resist said high pressure, a presssure responsive member in said conduit, said member being movable to closed position upon movement of said piston against said low-fluid pressure, whereby passage of fluid out of said cylinder yieldably displaces said movable means against said high-pressure source.

4. A hydraulic recoil mechanism comprising a cylinder, a piston movable in said cylinder, a source of low-fluid pressure, conduit means connecting said cylinder with said source of low-fluid pressure to maintain yieldable forward pressure on said piston, a source of high-fluid pressure, means connecting said source of high-fluid pressure in communicating relation with said conduit, means disposed between said source of high-fluid pressure and said last-mentioned means and movable to a fixed position to resist said high pressure, a pressure responsive member in said conduit, said member being movable to prevent return of said fluid to said source of low pressure upon movement of said piston against said low-fluid pressure, whereby passage of fluid out of said cylinder yieldably displaces said movable means progressively against said high-pressure source.

5. In a tracked vehicle, a track frame, an endless track, a driven sprocket engaging said track at one end thereof, an idler wheel engaging said track at the other end thereof, a track tensioning mechanism operativly engaging said wheel, said mechanism comprising means for exerting low pressure for mounting said idler in a normal forward position, additional means adapted to provide high resistance to rearward movement of said idler, and means associated with said first-mentioned means for actuating said second-mentioned means upon recoil of said idler wheel, said second-mentioned means being effective to return said wheel to normal position after recoil thereof.

6. In a tracked vehicle, a track frame, an endless track, a driven sprocket engaging said track at one end thereof, an idler wheel engaging said track at the other end thereof, a track tensioning mechanism operatively engaging said wheel, said mechanism comprising hydraulic means adapted to exert constant low forward pressure on said idler, an accumulator charged to a predetermined high pressure, means connecting said accumulator in communicating relation with said hydraulic means, and a check valve associated with said hydraulic means, said check valve being adapted to close upon initial rearward movement of said idler wheel whereby further rearward movement of said idler is resisted by said accumulator pressure.

7. In a tracked vehicle, a track frame, an endless track, a driven sprocket engaging said track at one end thereof, an idler wheel engaging said track at the other end thereof, a track tensioning mechanism, said mechanism comprising a hydraulic cylinder, a piston movable in said cylinder and operatively engaging said idler, a hydraulic pump, a hydraulic line connecting said pump to said cylinder to supply fluid under pressure on said piston, a piston-type accumulator charged to predetermined high pressure, means connecting said accumulator in communicating relation with said hydraulic line, and a check valve disposed in said hydraulic line, said check valve being adapted to close upon initial rearward movement of said piston whereby further rearward movement of said piston causes said fluid under pressure to temporarily enter said accumulator against said high pressure.

8. In a tracked vehicle, a track frame, an endless track, a driven sprocket engaging said track at one end thereof, an idler wheel engaging said track at the other end thereof, a track tensioning mechanism, said mechanism comprising a hydraulic cylinder pivotally connected to said track frame, a piston movable in said cylinder and operatively engaging said idler, a constant pressure hydraulic pump, a hydraulic line connecting said pump to said cylinder to provide constant low forward fluid pressure on said piston, an accumulator charged to a predetermined high pressure, a free piston disposed in said accumulator and normally bottomed therein by said high pressure, means connecting one end of said accumulator in communicating relation with said hydraulic line, and a check valve disposed in said hydraulic line between said last-mentioned means and said pump, said valve being adapted for movement to closed position upon initial rearward movement of said piston whereby recoil of said idler causes said fluid to displace said free piston against said high pressure in said accumulator.

9. In a tracked vehicle, a track frame, an endless track, a driven sprocket engaging said track at one end thereof, an idler wheel engaging said track at the other end thereof, a track tensioning mechanism, said mechanism comprising a hydraulic cylinder pivotally connected to said track frame, a piston movable in said cylinder and operatively engaging said idler, a constant pressure hydraulic pump, a hydraulic line connecting said pump to said cylinder to provide constant low forward fluid pressure on said piston, an accumulator, means for charging said accumulator to a predetermined high pressure, a free piston slidably disposed in said accumulator and normally maintained against one end thereof by said high pressure, an opening in said end, means connecting said opening in communicating relation with said hydraulic line, and a check valve disposed in said hydraulic line between said last-mentioned means and said pump, said check valve being adapted for movement to closed position upon initial rearward movement of said piston whereby recoil of said idler causes said fluid to displace said free piston in said accumulator.

10. In a tracked vehicle, a track frame, an endless track, a driven sprocket engaging said track at one end thereof, an idler wheel engaging said track at the other end thereof, a track tensioning mechanism operatively engaging said wheel, said mechanism comprising means for exerting low pressure for maintaining said idler in a normal forward position, additional means independent of said first means adapted to provide high resistance to rearward movement of said idler, and means associated with said first-mentioned means for disabling the latter and actuating said second-mentioned means upon recoil of said idler wheel, said second-mentioned means being effective to return said wheel to normal position after recoil thereof.

References Cited in the file of this patent

UNITED STATES PATENTS

| | | |
|---|---|---|
| 1,777,130 | Rode | Sept. 30, 1930 |
| 2,189,160 | Baker et al. | Feb. 6, 1940 |
| 2,561,901 | Bachman | July 24, 1951 |